United States Patent [19]

Hickok et al.

[11] Patent Number: 5,401,401
[45] Date of Patent: Mar. 28, 1995

[54] HANG ON TANK CANISTER FILTER

[75] Inventors: Roy S. Hickok, Moorpark; Charles O. Fuerst, Simi Valley, both of Calif.

[73] Assignee: Aquaria Inc., Moorpark, Calif.

[21] Appl. No.: 3,803

[22] Filed: Jan. 13, 1993

[51] Int. Cl.6 ............................................. A01K 63/04
[52] U.S. Cl. .................................. 210/169; 210/232; 210/249; 210/416.2; 210/440; 210/453; 119/259
[58] Field of Search ............... 210/169, 440, 416.2, 210/249, 453, 416.1, 232, 416.3; 119/5, 259, 260, 261; 417/420

[56] References Cited

U.S. PATENT DOCUMENTS

| | | | |
|---|---|---|---|
| 2,137,397 | 11/1938 | Haldeman | 210/416.2 |
| 2,275,428 | 3/1942 | Haldeman | 210/416.2 |
| 2,335,756 | 11/1943 | Haldeman | 210/416.2 |
| 2,537,965 | 1/1951 | Cantin, Jr. | 210/169 |
| 3,273,717 | 9/1966 | Canterbury | 210/416.2 |
| 3,371,789 | 3/1968 | Hense | 210/169 |
| 3,458,441 | 7/1969 | Dockery et al. | 210/169 |
| 3,688,907 | 9/1972 | Oravec | 210/169 |
| 3,785,342 | 1/1974 | Rogers | 119/5 |
| 3,891,555 | 6/1975 | Bennett et al. | 210/169 |
| 3,957,634 | 5/1976 | Orensten et al. | 210/169 |
| 4,024,064 | 5/1977 | Rakowicz et al. | 210/169 |
| 4,072,616 | 2/1978 | Rohlig | 210/493.5 |
| 4,093,547 | 6/1978 | Sherman et al. | 210/169 |
| 4,108,775 | 8/1978 | Wilkes et al. | 210/169 |
| 4,188,295 | 2/1980 | Burnett | 210/169 |
| 4,601,821 | 7/1986 | Sherman et al. | 210/169 |
| 4,895,646 | 1/1990 | Willinger | 210/169 |
| 4,994,177 | 2/1991 | Bogar, Jr. | 210/416.2 |
| 5,062,951 | 11/1991 | Tominaga | 210/169 |

FOREIGN PATENT DOCUMENTS

1110523 7/1961 Germany .

Primary Examiner—Robert A. Dawson
Assistant Examiner—Robert James Popovics
Attorney, Agent, or Firm—Spensley Horn Jubas & Lubitz

[57] ABSTRACT

An improved canister-type aquarium filter design which includes, in various combinations, a motor which is contained within the canister, a discharge tube arranged approximately along the longitudinal axis of the canister, a pump section from which water exits from the top, a cover securing device which applies force to the top of the cover, a clamp arrangement for securing tubes to ports on the cover, and an adjustable mounting system for mounting the filter to an aquarium frame. The improved design provides easy access to the filter cartridge, improves efficiency, and eliminates the need for flexible hoses traditionally used to connect the filter to an aquarium.

29 Claims, 11 Drawing Sheets

HANG ON TANK CANISTER FILTER

BACKGROUND OF THE INVENTION

1. Field of the Invention

The present invention is directed to a filter for use with an aquarium, and more particularly, to a canister filter.

2. Description of the Related Art

As described in U.S. Pat. No. 3,273,717 to Canterbury entitled "Combination Filter and Aerator," one type of aquarium filter, often referred to as a "nesting" type canister filter, includes a lower unit having a motor contained therein and an upper unit containing a filter cartridge. The upper unit mates with the lower unit which is designed to rest on a flat surface adjacent the tank. Additionally, the upper unit contains a pump section having a rotatable impeller which is driven by the motor. The bottom of the upper unit is closed in order to allow the upper unit to be removed for cleaning and filter replacement. As the bottom of the upper unit is closed, there is no direct contact between the motor and the impeller. Typically, the motor and impeller are magnetically coupled as shown in the '717 patent. U.S. Pat. No. 4,601,821 to Sherman et al., entitled "Freestanding Aquarium Filter," discloses an improved magnetic coupling which can substantially improve filter efficiency.

One of the major problems associated with "nesting" type canister filters is that water flow paths within canister filters are often asymmetrical such that clamping forces required for proper sealing are often not evenly distributed. Therefore, many prior art canister filters employ a plurality (four or more) of screws or retaining clips around the periphery of the cover to provide a tight seal at all points around the cover notwithstanding asymmetric loads on the cover. Consequently, it is often difficult to remove the cover from the canister to clean the filter.

Further problems associated with prior art canister filters are related to the use of flexible hoses to transport water between the tank and the filter. First, flexible hoses are generally relatively expensive and difficult to install. Second, in addition to the fact that over time they usually deteriorate, crack and leak, flexible hoses are frequently damaged when packaged by the manufacturer. Finally, flexible hoses can complicate cleaning because they often retain water after the filter has been stopped.

Still further, in many prior art canister filters the discharge tube passes between the canister wall and the filter cartridge. As a consequence, there is a significant reduction in the canister space available for the filter media.

SUMMARY OF THE INVENTION

It is an object of the present invention to provide an improved canister filter obviating, for practical purposes, the above mentioned limitations.

In accordance with the present invention, these and other objectives are achieved by providing a canister filter which includes, in various combinations, a motor which is contained within the canister, a discharge tube arranged approximately along the longitudinal axis of the canister, a pump section from which water exits from the top, a cover securing device which applies a central force to the top of the cover permitting rapid cover removal, a clamp arrangement for securing tubes to ports on the cover, and an adjustable mounting system for mounting the filter to an aquarium frame. The advantages of these features will be discussed below.

In one aspect of the invention, a discharge tube is arranged approximately along the longitudinal axis of the canister so that water exits toward the cover from the center of the canister. As a result, seals for the discharge tube may be aligned with the center portion of the cover and a single latching device may be used to secure the cover in place and apply the necessary sealing forces. Thus, the need for a plurality of latches positioned around the periphery of the cover is eliminated. As will be explained below, the single cover latching device of the illustrated embodiment is much easier to operate than a plurality of latches such that the amount of effort required to replace the filter cartridge while the canister remains on the tank is significantly reduced. Additionally, since water exits from the center portion of the filter, it is unnecessary to reduce the size of the filter cartridge in order to provide room for a discharge tube between the filter cartridge and the canister.

In yet another aspect of the present invention, a clamp arrangement for securing tubes to ports on the cover is provided which eliminates the need for flexible tubing. As explained below, the clamp arrangement makes cleaning and handling of the filter easier. Further, the arrangement facilitates connection of the filter to a variety of inlet and outlet devices such as undergravel filters, surface skimmers, biowheel accessories, spray bars, and special outlet diffusers.

In still another aspect of the present invention, an adjustable mounting system allows the filter to be securely mounted on any aquarium by simply hanging the filter on the aquarium frame and then making adjustments as necessary. In the illustrated embodiment, the mounting system includes a generally L-shaped wire hanger which may be readily positioned to accommodate different aquarium configurations. A lower stop may also be adjusted as necessary. As a result, a secure, vertical orientation of filter may be easily accomplished. Additionally, when required, a specific angled orientation may be achieved by merely adjusting the lower stop of the mounting system.

BRIEF DESCRIPTION OF THE DRAWINGS

A detailed description of a preferred embodiment of the invention will be made with reference to the accompanying drawings.

DETAILED DESCRIPTION OF THE PREFERRED EMBODIMENT

The following is a detailed description of the best presently known mode of carrying out the invention. This description is not to be taken in a limiting sense, but is made merely for the purpose of illustrating the general principles of the invention. The scope of the invention is defined by the appended claims.

Figure 1:
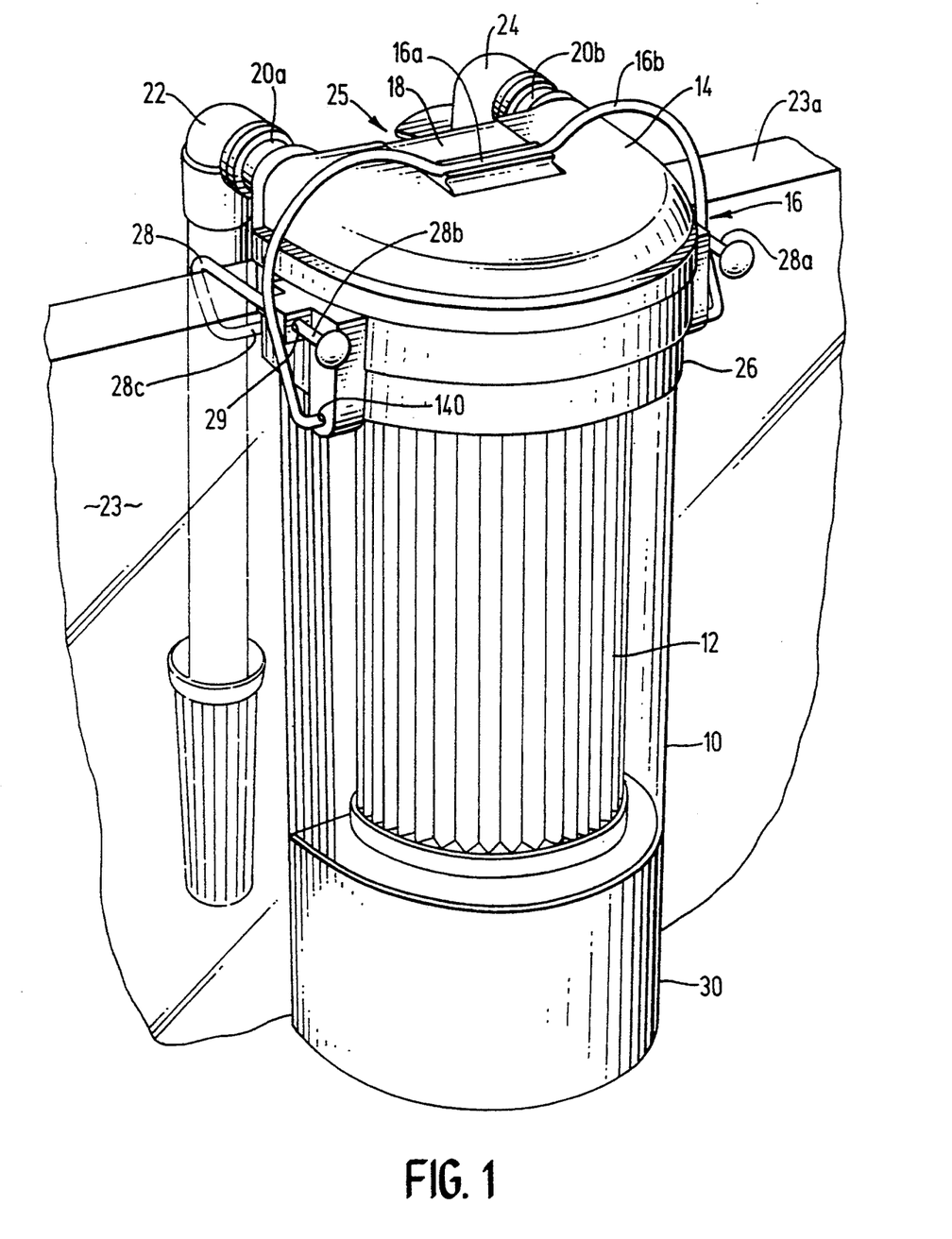
FIG. 1 is a perspective view in accordance with the preferred embodiment of the present invention.

As illustrated for example in FIG. 1, a preferred embodiment of the filter unit may include a filter canister 10 having a filter cartridge 12 contained therein. As depicted in the embodiment illustrated in FIG. 1, the filter cartridge 12 may be a fine mesh type, such as a pleated cylindrical cartridge formed of a fibrous material 12a. One example of such a filter is the REEMAY TM filter sold by the Reemay Corporation. Alternatively, the filter cartridge 12 may be a conventional cartridge formed of a pair of plastic or wire mesh screens having carbon granules or other appropriate media sandwiched between the screens. The filter canister 10 may include a removable cover 14. The cover 14 includes an inlet port 20a and an outlet port 20b. An inlet tube 22, which may be secured to the inlet port 20a, transfers water from an aquarium 23 to the canister 10. An outlet tube 24, which may be secured to the outlet port 20b, returns water from the canister 10 to the aquarium.

In the preferred embodiment illustrated for example in FIG. 1, a cover clamping mechanism indicated generally at 25 including a latch 18 and a clamp wire 16 may be employed to secure the cover 14 to the top of canister 10. Additionally, a generally L-shaped hanger wire 28, which extends horizontally behind the canister 10, may be used to adjustably hang the filter assembly on an aquarium frame 29. In the illustrated embodiment, the canister 10 is shaped generally as a half cylinder having a generally flat side 31 (FIG. 2) to abut the side of the aquarium 23.

A collar 26 may be used to provide locational and structural support for the clamp wire 16 and the hanger wire 28. The collar 26 may be a generally ring-like structure conforming to the shape of the canister 10 and may also include an inwardly facing projection 26a (visible in FIG. 2). During assembly, the collar 26 may be placed around the bottom portion of the canister 10 and slid upwardly until the inwardly facing projection 26a abuts a step 11 provided on the canister 10 and located approximately 1½" from the top of the canister.

As illustrated for example in FIG. 1, in a preferred embodiment the hanger wire 28 may include horizontal legs 28a and 28b and a rear portion 28c which extends between legs 28a and 28b. The hanger wire 28 may be slidably coupled to the collar 26 by inserting the horizontal legs 28a and 28b into respective apertures 29 of the collar, only one of which is visible in FIG. 1. The gap between the rear portion 28c and the collar 26 may be easily adjusted by sliding the hanger wire 28 horizontally in apertures 29. The position of the hanger wire 28 is maintained by friction between the horizontal legs 28a and 28b and the apertures 29. Thus, the filter assembly can be tightly attached to an aquarium frame or allowed to hang loosely. Additionally, a vertical orientation of the filter may be easily accomplished.

Figure 2:
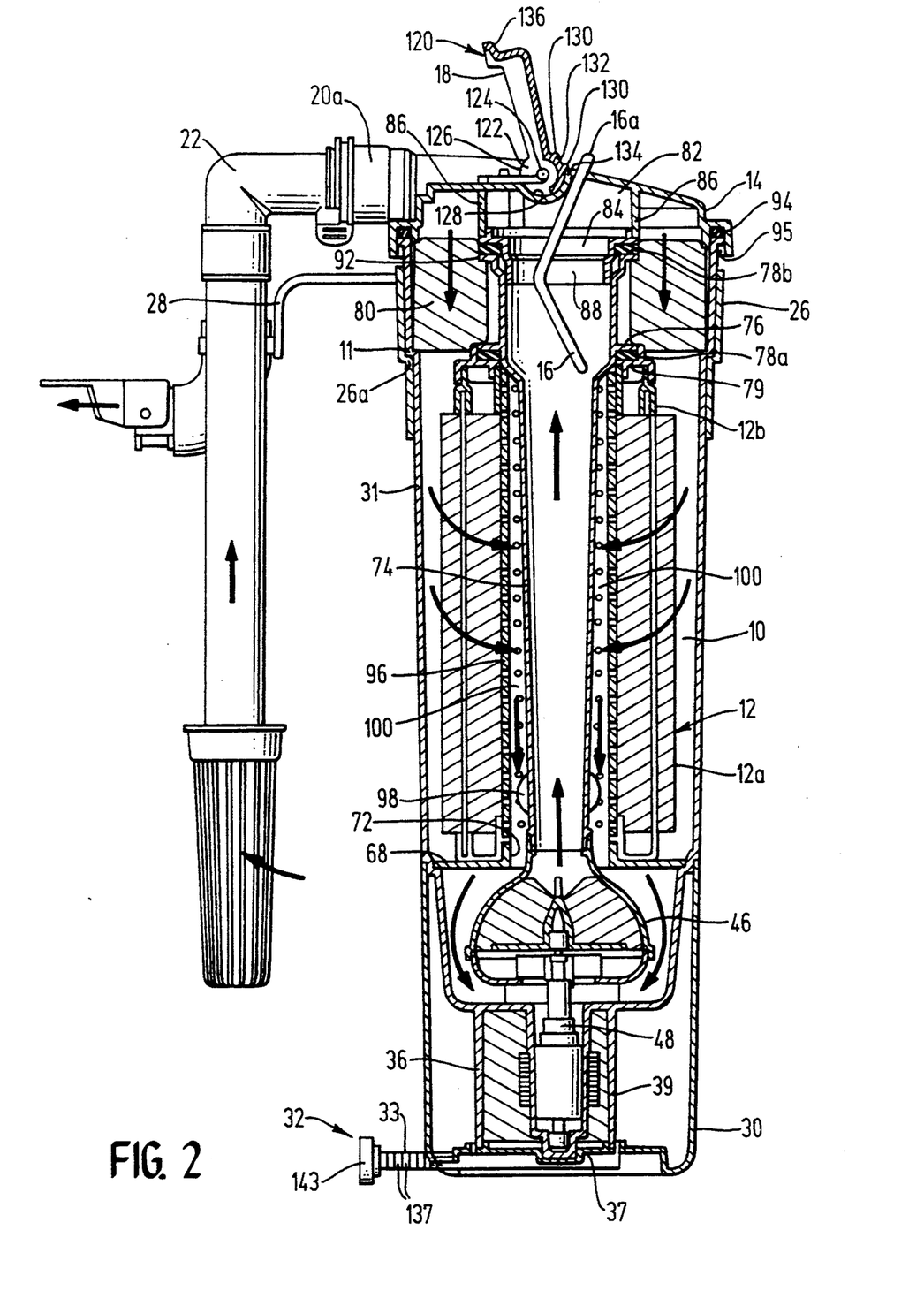
FIG. 2 is a sectional view of the embodiment illustrated in FIG. 1.
Figure 3:
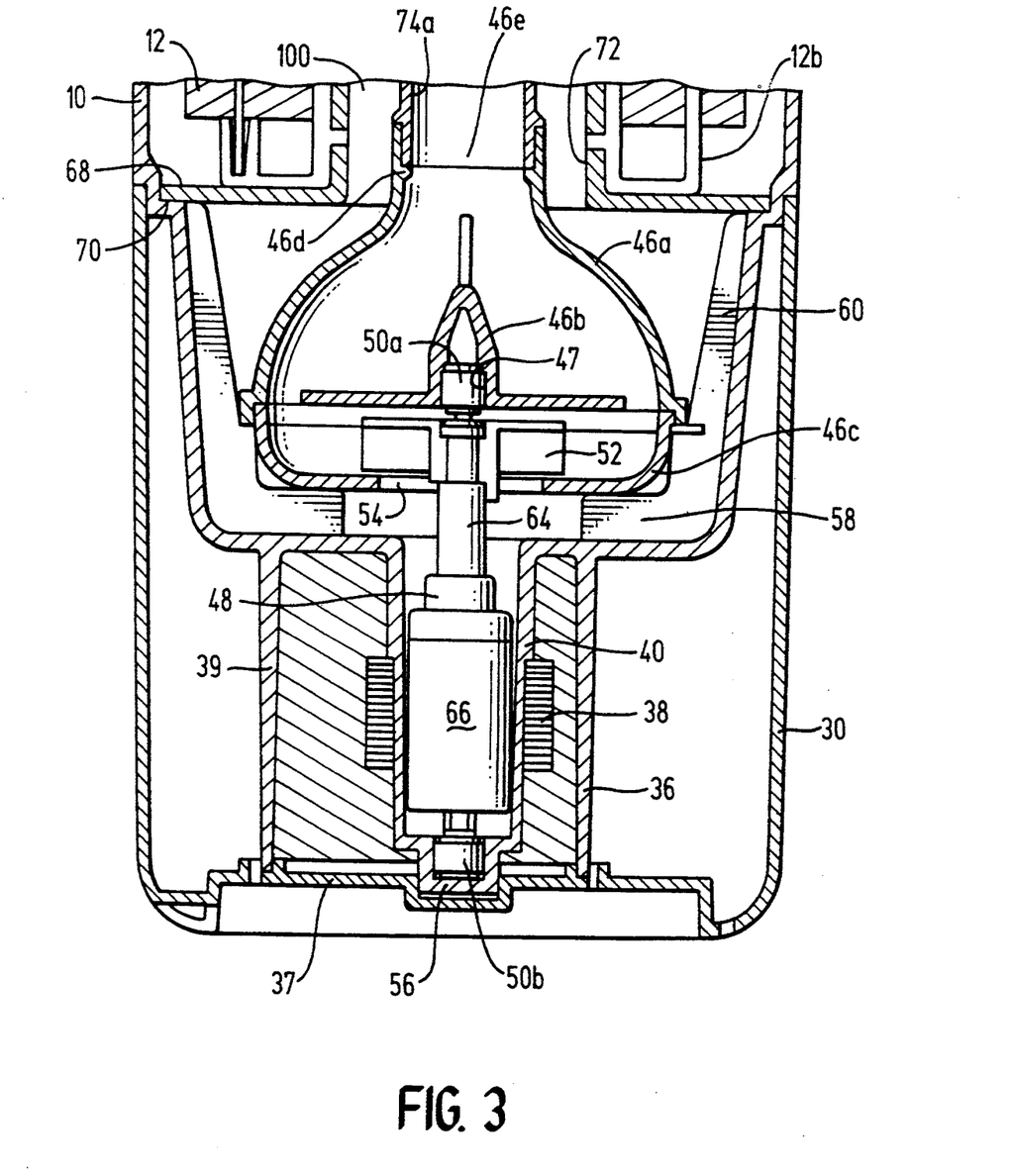
FIG. 3 is a sectional view of the bottom portion of the embodiment illustrated in FIG. 1.

Referring to the numbered elements in the embodiment illustrated for example in FIGS. 2 and 3, the lower section of canister 10 may be enclosed by a bottom cover 30. The bottom cover 30 may be secured to the canister 10 by an adhesive or by a mechanical fastener. An adjustable stop 32 for leveling the canister filter may be slidably coupled to the bottom cover 30. The bottom cover 30 also provides a cosmetic finish to the canister assembly by shrouding the portion of the canister that contains the motor.

Figure 11:
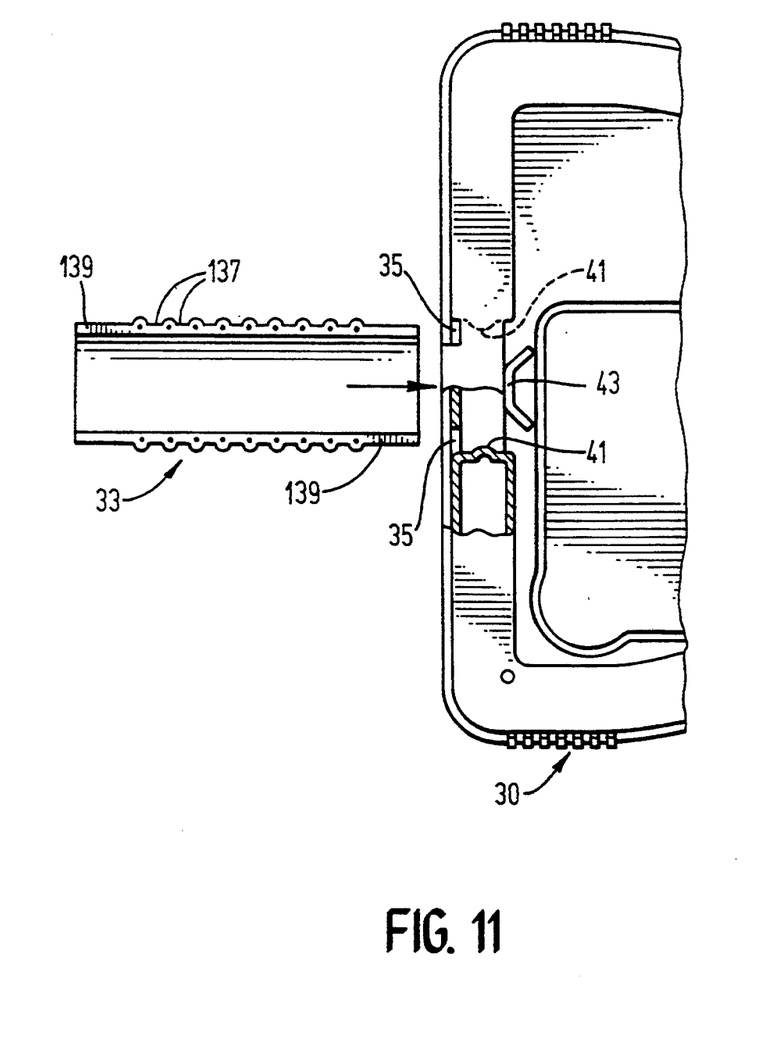
FIG. 11 is a bottom view illustrating the adjustable stop of the embodiment of FIG. 2.

As best seen in FIG. 11, the adjustable stop 32 includes a generally C-shaped spring 33 which is slidingly received by a pair of slots 35 formed in the bottom cover 30. The spring 33 has a plurality of detents 37 formed on the exterior of the legs 39 of the spring 33, which interact with a pair of ridges 41 formed in the cover 30 to selectively "lock" the spring 33 in place. As the legs 39 of the spring 33 are inserted into the slots, the legs 39 deflect inwardly and then spring outwardly as the ridges 41 of the cover 30 successively exit and enter the detents 37 formed in the spring 33. A V-shaped wall 43 aligned with the slots 35 of the cover 30 guides the legs 39 of the spring 33 and limits their inward deflection.

When the spring 33 is inserted to the desired depth to space the bottom of the canister 10 from the aquarium frame the desired distance, the ridges 41 engaging an associated pair of dents 37 releasably hold the spring 33 in place. In the illustrated embodiment, the spring 33 has eight pairs of detents 37. Consequently, the spring 33 of the stop 32 may be selectively "locked" in any one of eight positions, as desired. In this manner the desired vertical orientation of the canister 10 may be readily achieved. In the illustrated embodiment, the spring 33 has a foam pad 43 at the end of the spring 33 as shown in FIG. 2.

Figure 7:
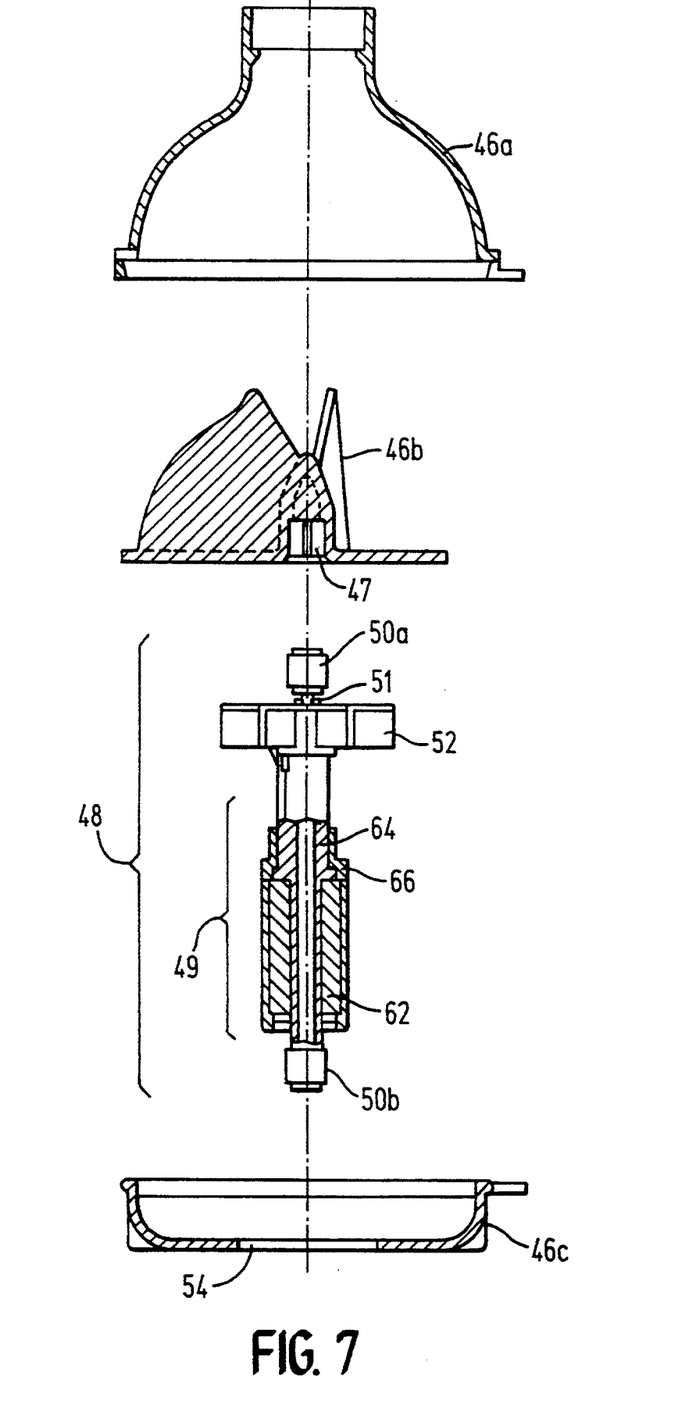
FIG. 7 is an exploded view of an impeller housing and an impeller assembly in accordance with the preferred embodiment of the present invention.
Figure 9:
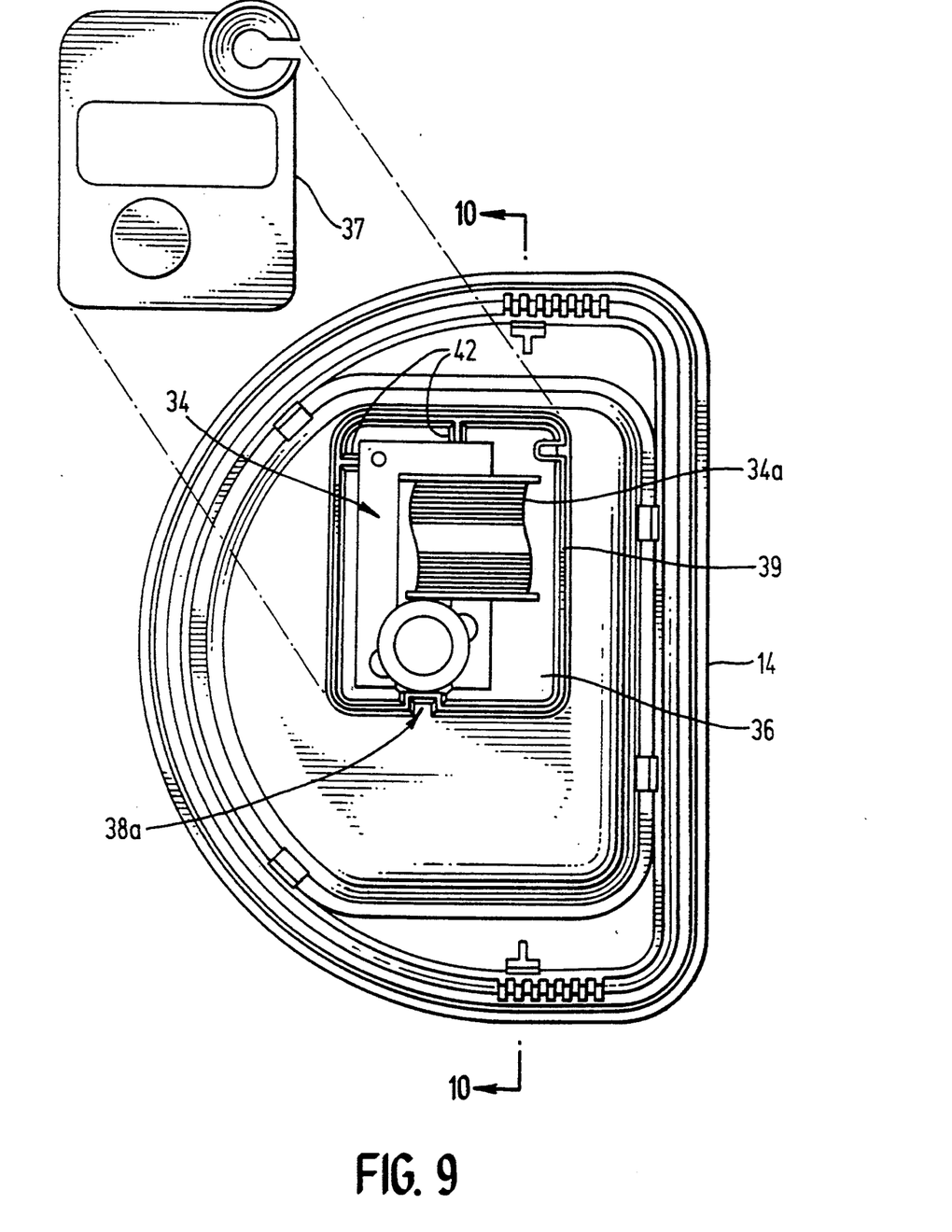
FIG. 9 is a sectional view of the bottom portion of the embodiment illustrated in FIG. 1.
Figure 10:
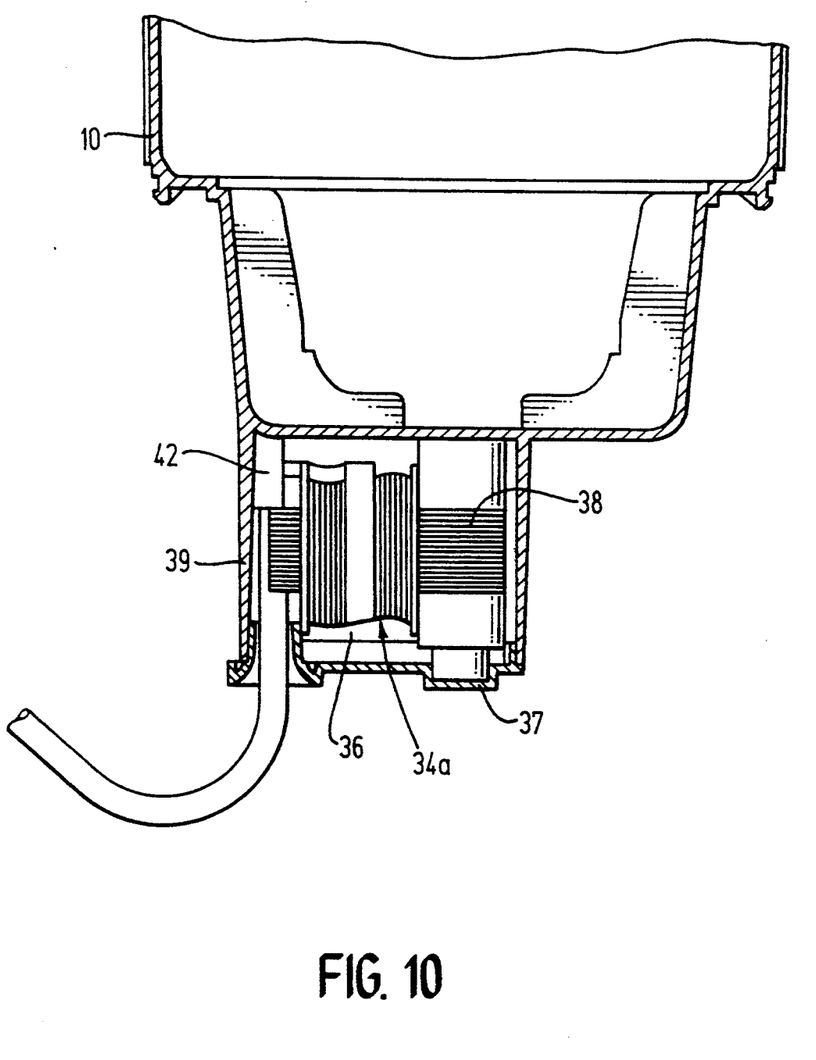
FIG. 10 is a sectional view taken along line 10—10 of FIG. 9.

As illustrated for example in FIGS. 2, 3, 7, 9 and 10, a pump impeller assembly 48 may include a magnet 62 (enclosed in a sleeve 66 as illustrated in FIG. 7) which may be located in a closed bottom portion 40 of the canister 10. Thus, water within the canister 10 will surround the magnet 62. As best seen in FIGS. 9 and 10, a stator 34 includes flux carrying laminations 38 which define a gap 38a which may be centered at the closed bottom portion 40. The stator laminations 38 are supported by locating ribs 42. The stator also includes a winding 34a. A canister extension 39 together with the bottom portion 40 forms a cavity 36 which is filled with an encapsulant that retains the motor stator 34 and provides electrical insulation and good thermal conductivity. A motor cover 37 may be attached to the end of the extension 39 to completely enclose the motor stator 34 and the encapsulant.

Figure 8:
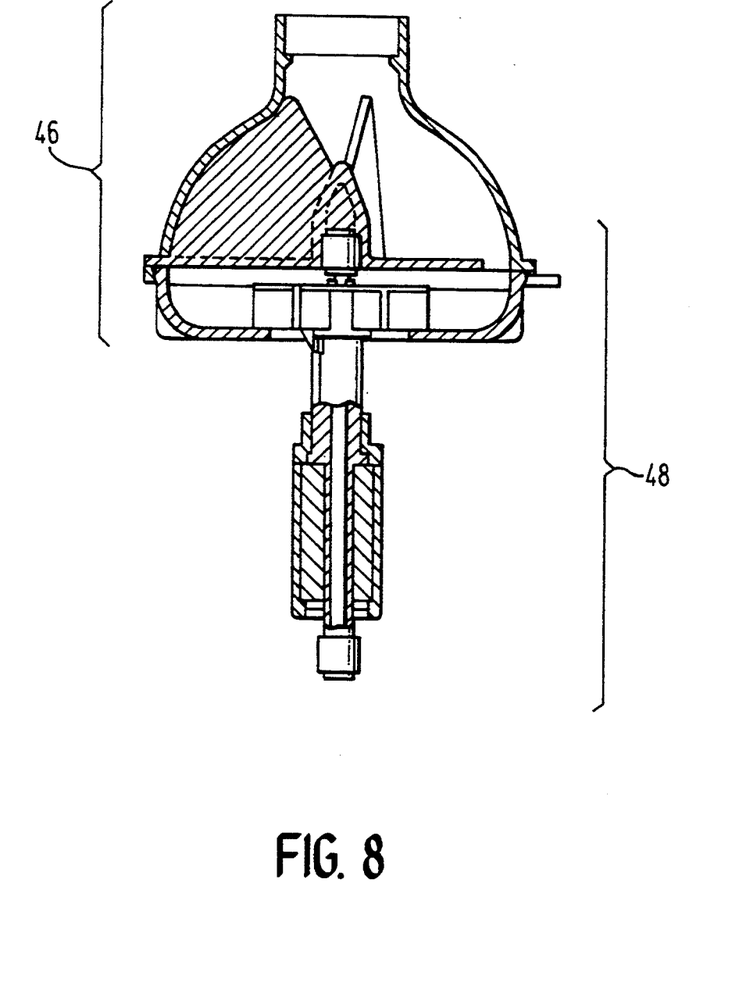
FIG. 8 is a sectional view of the impeller housing and impeller assembly illustrated in FIG. 7.

As illustrated for example in FIGS. 3, 7 and 8, a 3-part generally "onion shaped" impeller housing 46 and the pump impeller assembly 48 may be positioned inside the canister 10. A stationary center diffuser 46b having three vanes snaps into a top housing portion 46a. As the impeller 52 of the assembly 48 is larger in diameter than an inlet hole 54 of a housing base portion 46c, the impeller assembly 48 must be attached to the center diffuser 46b before final assembly of the impeller housing 46. The impeller assembly 48 may be attached to center diffuser 46b by pressing a rubber sleeve 50a on the impeller assembly into a blind hole 47 in center diffuser 46b. The rubber sleeve 50a supports one end of a rod 51.

The magnet 62 is rotatably supported by the rod 51. Finally, the base 46c may be snapped into the top housing 46a. The impeller assembly 48 and the housing 46 are then placed in the canister 10 such that the rotor portion 49 of the impeller assembly 48 is received on the inside of the bottom portion 40 of the canister 10 (FIG. 3) and a rubber sleeve 50b on impeller assembly is received in a pocket 56 at the bottom of the bottom portion 40. The rubber sleeve 50b supports the other end of the rod 51. The base 46c of the impeller housing 46 abuts ribs 58 (FIG. 3) of the canister 10. The center diffuser 46c and top housing 46a are centered by ribs 60 of the canister 10.

The magnet 62 may be secured to the impeller 52 of the impeller assembly 48 by inner and outer sleeves 64 and 66, respectively, and aligned with the laminations 38 of the stator 34. The inner sleeve 64 includes a bearing surface in contact with the rod 51. To drive the impeller 52, an alternating current is supplied to the windings 34a, creating an alternating magnetic field in the laminations 38. The magnetic field causes the magnet 62 to rotate at synchronous speed, thus driving the impeller 52 via the inner and outer sleeves 64 and 66. The closed bottom portion 40 of the canister 10 between the laminations 38 and the rotor 49 seals the stator 34 from the water flowing through the canister 10.

Referring to the numbered elements in the embodiment illustrated in FIGS. 2 and 3, immediately above the impeller housing 46, a bottom plate 68 having a circular opening 72 is supported by a shoulder 70 in the canister 10. The shoulder 70 centers bottom plate 68 within the canister. A supporting structure 12b of the filter cartridge 12 may be arranged on top of bottom plate 68. A discharge tube 74 is placed within filter cartridge 12 with a bottom end 74a of the discharge tube 74 being received by a tubular opening 46e at the top of top housing portion 46a. The bottom end 74a of the discharge tube 74 is supported by a shoulder 46d of the top of top housing portion 46a. A pre-filter media such as a sponge 80 may be placed in the canister 10 such that the inside diameter of the media 80 fits around the top portion of the discharge tube 74. When the cover 14 is installed, a lower flange 76 on the discharge tube 74 presses against a foam gasket 78a located between a top surface 79 of the filter cartridge 12 and the flange. The gasket 78a provides sealing between the discharge tube 74 and the filter cartridge 12 to ensure that water drawn into the canister does not bypass the filter cartridge 12.

Figure 4:
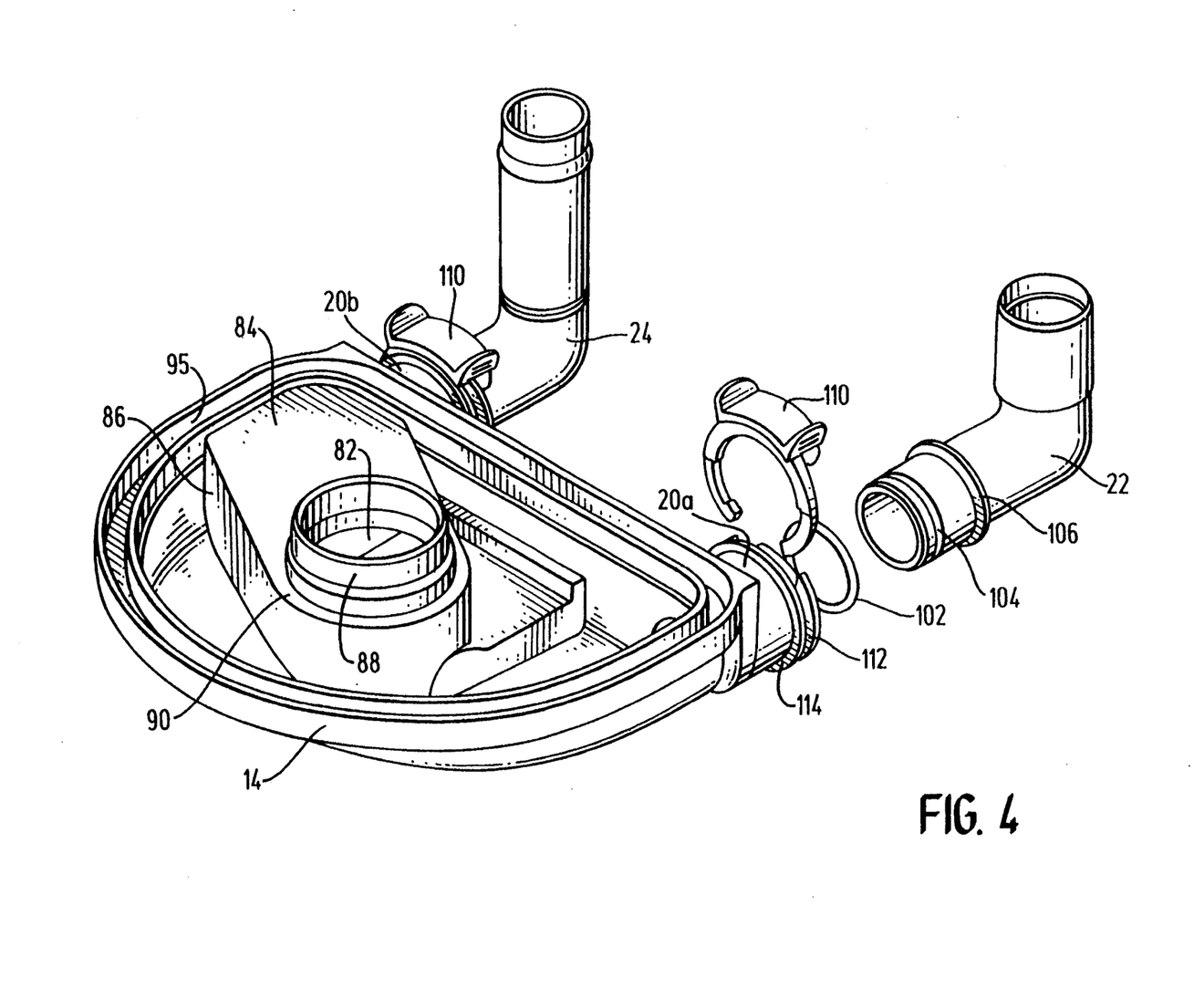
FIG. 4 is a perspective view of the bottom portion of a cover in accordance with the preferred embodiment of the present invention.

As illustrated for example in FIGS. 2 and 4, the cover 14 includes the sealed flow path 82 formed by wall members 84 and 86. The sealed flow path 82 connects the outlet port 20b to the inside of a cylindrical projection 88 on the wall member 84. The cylindrical projection 88 may be received within the discharge tube 74 thereby coupling the discharge tube 74 and the sealed flow path 82. A surface 90 on the wall member 84 presses against a foam gasket 78b located between a top flange 92 on the discharge tube 74 and the cover 14. The gasket 78b provides sealing between the discharge tube 74 and the flow path 82. A seal 94 received in a channel 95 found in the cover 14 provides sealing between the cover 14 and the canister 10.

The filter cartridge 12 includes a perforated center tube 96. The center tube 96 may be located against the top of circular opening 72. Ribs 98 on the discharge tube 74 abut the center tube 96, thus causing the filter cartridge 12 to be centered relative to, i.e. coaxial with, the impeller housing 46.

Referring to the numbered elements in the embodiment illustrated for example in FIG. 2, when the impeller assembly 48 begins rotating, water will flow in the direction of the arrows from the impeller housing 46, through the discharge tube 74, through the sealed flow path 82 in the cover 14, through the outlet port 20b, and finally back to the aquarium through the outlet tube 24. Accordingly, the water level in the canister 10 drops, thereby creating a vacuum within canister 10.

The vacuum reaches a level sufficient to draw water from the aquarium through inlet tube 22 and inlet port 20a, and the vacuum increases until the flow of water through the inlet tube 22 to the canister 10 equals the flow of water discharged through the outlet tube 24.

Additionally, the pumping action creates a differential pressure across the filter cartridge 12, with the pressure in open space 100 between the perforated center tube 96 and the discharge tube 74 being less than the pressure around cartridge 12 in canister 10. This causes water to flow radially inwardly in canister 10 through the filter cartridge 12 and into the open space 100. The water in the open space 100 is drawn in an intake flow which flows from the open space 100 down and around the outside of the impeller housing 46 and then through the inlet hole 54 in the base 46c of impeller housing 46. At that point the impeller 52 acts on the water causing it to flow up through the inside of the impeller housing 46 in a discharge flow into the discharge tube 74 from the top of the impeller housing 46. The discharge flow of water exits the discharge tube 74 and enters the sealed flow path 82 in the cover 14 at the cylindrical projection 88. From the sealed path 82 of the cover 14 the flow of water is discharged into the aquarium through the outlet port 20b.

It should be appreciated from the above that the discharge flow below the cover 14 is coaxially aligned with the intake flow from the filter cartridge 12 and is separated from the co-axial intake flow by the impeller housing 46 and the discharge tube 74. Because the discharge tube 74 is centered within the interior of the filter cartridge, the space available within the canister for filter media has been substantially increased.

In addition, it has been found that the coaxial stacked arrangement of the rotor 49, the impeller 52, the impeller housing 46, the discharge tube 74, and the cylindrical intake projection 88 of the cover 14 has several other advantages. For example, the latch 18 may be positioned relative to the discharge tube 74 such that the resultant clamping force applied by the latch 18 is substantially evenly distributed and substantially vertically oriented, even though the latch 18 is a singular device. As a consequence, the clamping force is centered and aligned with the annular surface 90 of the cover 14 and the top annular flange 92 of the discharge tube 74 so that the gasket 78b therebetween is firmly clamped to provide a good seal between the discharge tube 74 and the cover 14. In a similar manner, the clamping force is centered and aligned with the lower annular flange 76 of the discharge tube and the top annular surface 79 of the filter cartridge 12 so that the gasket 78a therebetween is firmly clamped to provide a good seal between the discharge tube 74 and the filter cartridge 12.

Still further, the impeller 52, the impeller housing 46 and the discharge tube 74 are coaxially aligned so that the discharge flow of water through these elements is straight. It is believed that reducing changes in direction of the flow path increases the efficiency of the overall system.

Figure 5:
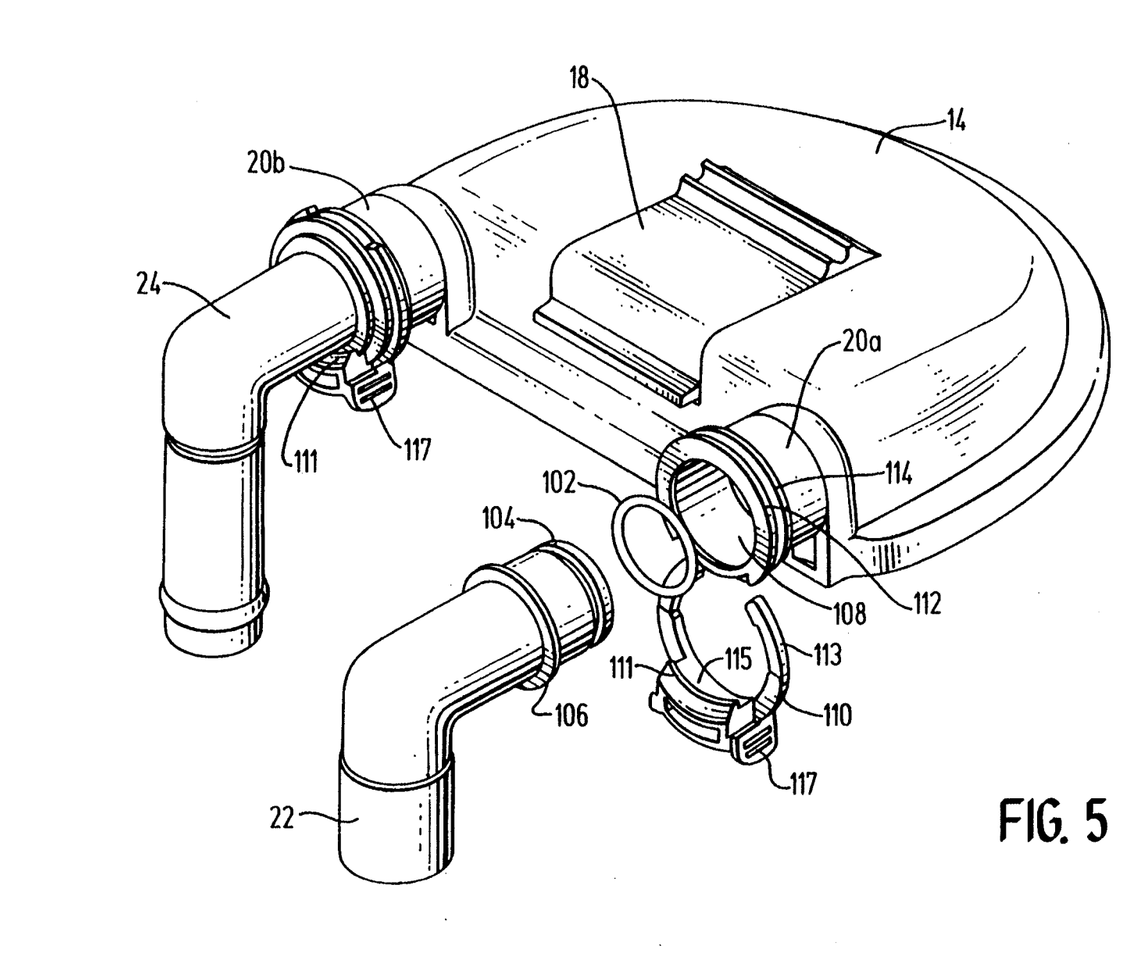
FIG. 5 is a perspective view of the top of the cover illustrated in FIG. 4.
Figure 6:
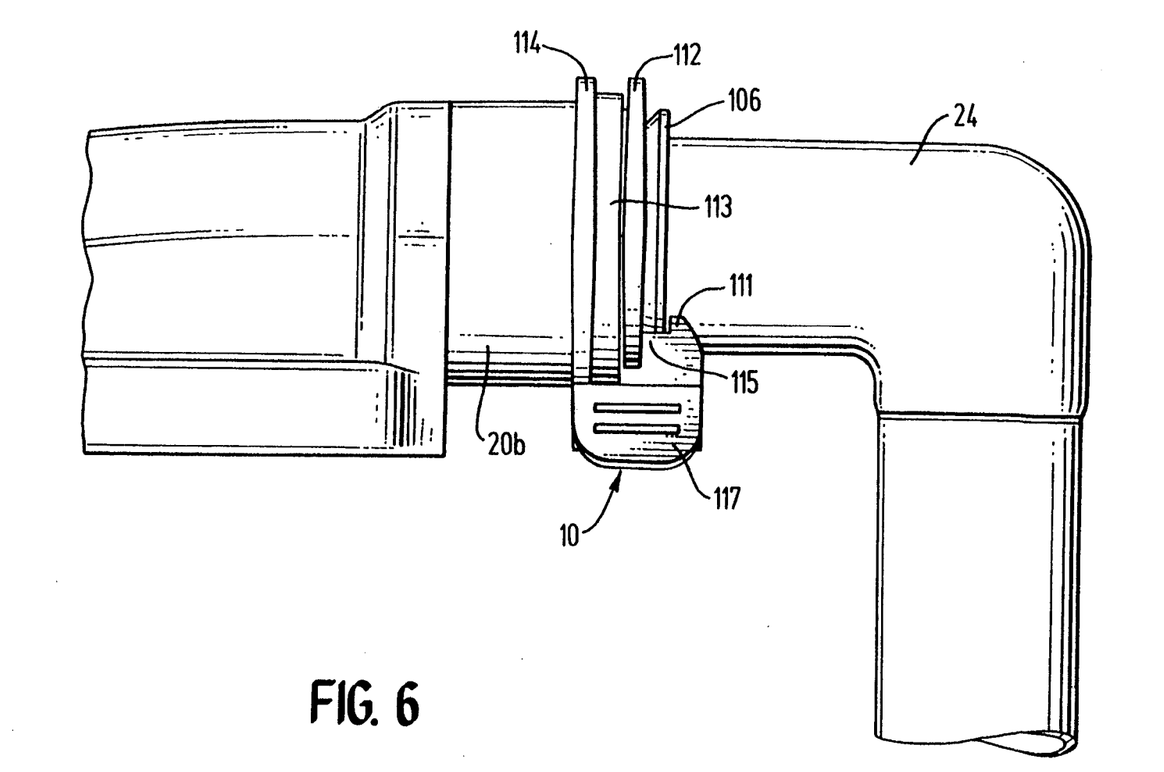
FIG. 6 is a side view of the cover illustrated in FIG. 4.

The filter system may be supplied without inlet tube 22 and outlet tube 24 installed. As illustrated for example in FIGS. 4–6, the inlet tube 22 and the outlet tube 24 are identical in the areas that are inserted into the inlet port 20a and the outlet port 20b, respectively. Each tube may include an o-ring 102 assembled in a groove 104 on one side of a chamfered annular projection, or flange, 106. The groove 104 and the projection 106 are arranged such that the o-ring 102 seals within a bore 108 before the projection 106 snaps past a locking ring 110. The locking ring 110 includes a c-shaped plastic ring portion 113 that can resiliently open to receive and then close to partially encircle one of the tubes (22 or 24) as the ring portion 113 slides vertically between cylindrical ribs 112 and 114. When one of the tubes (22 or 24) is inserted into one of the ports (20a or 20b), the chamfer of projection 106 deflects a resilient integral catch portion 111 of locking ring 110 and then moves past portion 111. The catch portion 111 is coupled to the ring portion 113 of the locking ring 110 by an integral stem portion 115. After the projection 106 passes the portion 111, portion 111 resiliently moves up behind projection 106 to retain the tube (22 or 24). Similarly, when removing one of the tubes (22 and 24), one presses down on finger tabs 117 of locking ring 110 which moves the catch portion 111 out of the path of the projection 106 which allows the tube to be pulled out of the port. Once the finger tabs 117 are released, the ring portion 113 resiliently reseats the ring 110 in the cylindrical ribs 112 and 114 of the tube.

When removing the filter of the illustrated embodiment from the tank for cleaning, one simply disconnects the power cord from the wall receptacle, removes the inlet tube 22 and the outlet tube 24 from the cover 14, lifts the filter off the aquarium frame and carries it to a sink.

In another aspect of the invention, as best seen in FIG. 2, the latch 18 includes a latch arm 120 which is pivotally coupled at one end 122 to the cover 14 by a pivot pin 124. The pivot end 122 of the latch arm 120 has a rounded bearing surface 126 which is received by a concave bearing surface 128 recessed in the cover 14. The pivot end 122 also has a pair of ridges 130 which define a groove 132. Rotation of the latch arm 120 in the clockwise direction is limited by the forward ridge 130 which engages a stop surface 134 of the concave bearing surface 128 when the tab end 136 of the latch arm 120 is lifted to the maximum upward position. In this position of the latch arm 120, the clamp wire 16 which is pivotally coupled to the collar 26, may be pivoted so that the top horizontal portion 16a of the clamp wire 16 may be received by the groove 132 of the latch arm 120.

To clamp the cover 14 in place, the tab end 136 of the latch arm 120 is rotated downwardly which causes the groove 132 at the pivot end of the latch arm 120 to lift the clamp wire portion 16a of the clamp wire 16 upward, which applies a downward, clamping force on the cover 14 in response. As best seen in FIG. 1, the clamp wire 16 includes two generally C-shaped portions 16b, each of which is joined to the central portion 16a at one end and is pivotally received by a bore 140 in the collar 26 at the other end. As the central portion 16a of the clamp wire 16 is lifted by the latch arm 120 of the latch 18, the C-shaped portions 16b of the clamp wire flex and open, which applies a spring tension to the cover 14. To unlatch the cover 14, the tab end 136 of the latch arm 120 is rotated upwardly which pivots the central portion 16a of the clamp wire 16 downwardly. This releases the tension on the clamp wire 16, allowing the clamp wire 16 to be pivoted away and the cover 14 removed.

Thus, in order to remove the filter cartridge 12 for cleaning or replacement while the filter remains on the tank, one simply disconnects the power cord from the wall receptacle, lifts the latch 18 and swings the clamp wire 16 to the back of the cover 14, i.e. to the right in FIG. 2. The cover 14 may then be removed. Next, the discharge tube 74 and the pre-filter media 80 can be removed so that the filter cartridge 12 is accessible. After returning the cover 14 to the canister 10, the latch 18 may be lifted until the groove 132 is adjacent to the top of cover 14 so that the clamp wire 16 may be rotated into groove 132. The latch 18 may then be lowered in order to produce tension in the clamp wire 16 and secure the cover 14 to the canister 10. As the top of the filter may be mounted above the water level of the aquarium, all of the above may be performed without leaks or spills.

A system for expelling gas which may accumulate is described in copending and contemporaneously filed application (our docket PD-2449), co-owned by the assignee of this application and entitled "Gas Expelling Device" the subject matter of which is incorporated herein by reference.

Although the present invention has been described in terms of a preferred embodiment above, numerous modifications and additions to the above-described preferred embodiment would be readily apparent to one skilled in the art. It is intended that the scope of the present invention extends to all such modifications and additions and that the scope of the present invention is limited solely by the claims set forth below.

I claim:

1. An aquarium filter, comprising:
   a canister defining an open top, a closed, imperforate side and a closed bottom,
   a cover for sealing the open top of the canister,
   a fluid inlet and a fluid outlet each communicating with a respective region within the canister,
   a porous filter element located within the canister,
   a pump including an impeller, the pump located within the canister and in fluid communication with the filter element, and
   a motor operably connected to the impeller, the motor including a rotating magnet positioned substantially within the bottom of the canister, mechanically connected to the impeller and in fluid communication with the pump.

2. An aquarium filter according to claim 1, wherein the motor includes a stator, the aquarium filter further comprising:
   a canister extension, the canister extension and the closed bottom defining a sealed cavity,
   wherein the stator is located substantially within the cavity and the rotating magnet is positioned within the stator.

3. An aquarium filter for an aquarium having a frame portion, comprising:
   a canister, a fluid inlet and a fluid outlet each communicating with a respective region within the canister,
   a porous, annular filter element located within the canister in communication with the fluid inlet, a discharge tube located within the canister in communication with the fluid outlet and surrounded by the filter element, a pump located within the canister and in fluid communication with the filter element and the discharge tube, and adjustable mounting means mounted on an upper portion of the canister, for adjustably mounting the filter on the frame portion of the aquarium.

4. An aquarium filter according to claim 3, wherein the adjustable mounting means comprises a hanger wire, adjustably mounted on the upper portion of the canister, for hanging the filter on the aquarium.

5. An aquarium filter according to claim 3, wherein the canister defines a lower portion and the adjustable mounting means further comprises an adjustable stop, adjustably mounted on the lower portion of the canister, for adjustably spacing the lower portion of the canister from the aquarium.

6. An aquarium filter according to claim 5 wherein the adjustable stop comprises a generally C-shaped spring having a plurality of detents and the lower portion of the canister defines a slot to receive the spring and the slot has at least one projection positioned to selectively engage detents of the spring so as to releasably secure the spring in place.

7. An aquarium filter, comprising:
a canister defining a longitudinal axis, a fluid inlet and a fluid outlet each communicating with a respective region within the canister,
a porous, annular filter element located within the canister in communication with the fluid inlet,
a discharge tube located within the canister in communication with the fluid outlet and surrounded by the filter element and arranged approximately along the longitudinal axis of the canister, and
a pump located within the canister and in fluid communication with the filter element and the discharge tube.

8. An aquarium filter according to claim 7, wherein the pump is disposed for drawing water from the filter element and delivering water to the discharge tube.

9. An aquarium filter according to claim 7, wherein the canister defines an open top, the aquarium filter further comprising:
a cover for covering the open top of the canister, the cover carrying the fluid inlet and the fluid outlet.

10. An aquarium filter, comprising:
a canister, a fluid inlet and a fluid outlet each communicating with a respective region within the canister,
a filter element having a filter media located within the canister,
a discharge tube located within the filter element and surrounded by the filter media, and
a pump located within the canister and in fluid communication with the filter element and the discharge tube, the filter media and the discharge tube being located in the canister and the pump being operative for causing fluid to flow through the canister from the fluid inlet and through the filter media to the pump, and then through the discharge tube from the pump to the fluid outlet.

11. An aquarium filter accordingly to claim 10 wherein the filter element is a filter cartridge which defines a central longitudinal opening and the discharge tube passes through the central opening of the filter cartridge.

12. An aquarium filter according to claim 11 further having an intake flow of fluid from the central opening of the filter cartridge to the pump and a discharge flow of fluid through the discharge tube wherein the discharge tube is centrally located within the central opening.

13. An aquarium filter according to claim 12 wherein the pump is located in a lower portion of the canister so that the intake flow of fluid is directed downwardly and the discharge flow of fluid is directed upwardly.

14. An aquarium filter, comprising:
a closed canister having a top portion and a bottom portion,
a fluid inlet and a fluid outlet each communicating with a respective region within the canister and providing the only paths for fluid flow into and out of the canister,
a filter element located within the canister,
a discharge tube located within the canister, and
a pump including a housing, the housing defining a top portion and a bottom portion, the bottom portion having an inlet opening and the pump located within the bottom portion of the canister and in fluid communication with the filter element and the discharge tube,
wherein the canister is constructed to provide a flow path between the fluid inlet and the inlet opening and upwardly through the pump.

15. An aquarium filter according to claim 14, wherein the pump is located such that water enters the pump from the filter element and exits the pump to the discharge tube.

16. An aquarium filter according to claim 14, wherein the canister defines an open top, the aquarium filter further comprising:
a cover for covering the open top of the canister, the cover carrying the fluid inlet and the fluid outlet.

17. An aquarium filter according to claim 16 wherein the cover has a first sealing surface surrounding the fluid outlet and the discharge tube defines a second sealing surface facing the first sealing surface of the cover, the filter further comprising a clamp for clamping the cover to the canister so that the cover first sealing surface is driven toward the discharge tube second sealing surface to seal the cover to the discharge tube.

18. An aquarium filter according to claim 17 wherein the filter has a resilient sealing gasket between the first and second sealing surfaces of the cover and discharge tube, respectively.

19. An aquarium filter according to claim 17 wherein the first and second sealing surfaces of the cover and discharge tube, respectively, are aligned with the center of the cover.

20. An aquarium filter according to claim 17 wherein the discharge tube passes through the center of the filter element and has a third sealing surface and the filter element defines a fourth sealing surface facing the third sealing surface of the discharge tube, and wherein actuation of the clamp causes the cover to engage the discharge tube so that the discharge tube third sealing surface is driven toward the filter element fourth sealing surface to seal the discharge tube to the filter element.

21. An aquarium filter according to claim 20 wherein the filter has a second gasket between the third and fourth sealing surfaces of the discharge tube and the filter element, respectively.

22. An aquarium filter according to claim 14, wherein the housing includes a center diffuser, the aquarium filter further comprising:
   an impeller located substantially between the center diffuser and the bottom portion of the housing so that the center diffuser is located in a path of fluid flow between the impeller and the fluid outlet,
   a rotor operably connected to the impeller, the rotor including a magnet located substantially within the bottom portion of the canister, and
   a stator arranged outside the bottom portion of the canister.

23. An aquarium filter according to claim 22, further comprising a rod defining a first end and a second end, the first end supported by the diffuser and the second end supported by the bottom portion of the canister,
   wherein the rotor and the impeller are rotatably supported by the rod.

24. An aquarium filter according to claim 23, wherein the rotor includes a sleeve operably connected to the impeller and encapsulating the magnet and having a bearing surface in contact with the rod.

25. An aquarium filter, comprising:
   a canister defining an open top and a closed bottom portion, a fluid inlet and a fluid outlet each communicating with a respective region within the canister,
   a filter element located within the canister,
   a pump located within the canister and in fluid communication with the filter element,
   a cover for covering the open top of the canister, the cover defining a central portion, and
   cover securing means comprising a clamp wire rotatably connected to the canister for applying a force to the central portion of the cover.

26. An aquarium filter according to claim 25, wherein the cover securing means further comprises a latch, operably connected to the cover, for holding the clamp wire in a cover closing position.

27. An aquarium filter, comprising:
   a canister defining an open top and a closed bottom portion, a fluid inlet and a fluid outlet each communicating with a respective region within the canister,
   a filter element located within the canister,
   a pump located within the canister and in fluid communication with the filter element,
   a cover for covering the open top of the canister, the cover defining a port having a rib, the port being in fluid communication with one of the filter element and the pump,
   a rigid tube having a projection located to be substantially adjacent to the rib when the tube is secured to the port, and
   clamp means for removably securing the tube to the port.

28. An aquarium filter according to claim 27, wherein the clamp means comprises a ring portion and a hook portion, the ring portion substantially adjacent one of the projection and the rib, and the hook portion substantially adjacent to the other of the projection and the rib when the tube is secured to the port by the clamp means.

29. A aquarium filter, comprising:
   a canister defining a longitudinal axis, an open top, a closed bottom portion, and an extension, the closed bottom portion and the extension defining a cavity,
   a cover for covering the open top, the cover defining an inlet and an outlet, at least one of the inlet and the outlet defining a rib,
   a tube in fluid communication with aquarium and the at least one of the inlet and the outlet, the tube defining a projection, the projection and the rib being substantially adjacent when the tube and the at least one of the inlet and the outlet are in an assembled orientation,
   a filter element located within the canister in fluid communication with the inlet,
   a discharge tube located within the canister and arranged approximately along the longitudinal axis of the canister, the discharge tube in fluid communication with the outlet,
   a pump located in the closed bottom portion of the canister and including an impeller, a top discharge portion and a bottom intake portion, the bottom intake portion of the pump being in fluid communication with the filter element and the top discharge portion of the pump being in fluid communication with the discharge tube,
   a motor including a stator located substantially within the cavity and a rotating magnet located substantially within the closed bottom portion and operably connected to the impeller,
   a hanger wire, adjustably mounted on an upper portion of the canister, for hanging the filter on the aquarium,
   an adjustable stop, adjustably mounted on the bottom portion of the aquarium, for adjustably spacing the lower portion of the canister from the aquarium,
   a clamp wire rotatably coupled to the canister, the clamp wire being constructed and arranged to apply a force to a center portion of the cover, and
   a latch rotatably connected to the cover, the latch being constructed and arranged to hold the clamp wire in a cover closing position.

* * * * *